(12) United States Patent
Karlapalem

(10) Patent No.: US 11,118,888 B2
(45) Date of Patent: Sep. 14, 2021

(54) APPARATUS AND METHODS FOR MEASURING THREAD DEPTH ON A THREADED MEMBER

(71) Applicant: GRANT PRIDECO, L.P., Houston, TX (US)

(72) Inventor: Lalit Chandra Sekhar Karlapalem, Tomball, TX (US)

(73) Assignee: Grant Prideco, L.P., Houston, TX (US)

( * ) Notice: Subject to any disclaimer, the term of this patent is extended or adjusted under 35 U.S.C. 154(b) by 122 days.

(21) Appl. No.: 16/480,771

(22) PCT Filed: Feb. 19, 2018

(86) PCT No.: PCT/US2018/018589
§ 371 (c)(1),
(2) Date: Jul. 25, 2019

(87) PCT Pub. No.: WO2018/152458
PCT Pub. Date: Aug. 23, 2018

(65) Prior Publication Data
US 2020/0003538 A1     Jan. 2, 2020

Related U.S. Application Data

(60) Provisional application No. 62/460,727, filed on Feb. 17, 2017.

(51) Int. Cl.
*G01B 3/22* (2006.01)
*G01B 5/20* (2006.01)
(Continued)

(52) U.S. Cl.
CPC ............... *G01B 3/22* (2013.01); *G01B 3/48* (2013.01); *G01B 5/204* (2013.01); *G01B 5/207* (2013.01)

(58) Field of Classification Search
CPC . G01B 5/204; G01B 3/48; G01B 3/22; G01B 5/207
(Continued)

(56) References Cited

U.S. PATENT DOCUMENTS 1,256,967 A * 2/1918 Wolfe .................. G01B 3/40
33/199 R
1,442,333 A * 1/1923 Gaugh .................. G01B 5/163
33/199 R
(Continued)

FOREIGN PATENT DOCUMENTS

EP         0869328 A2 * 10/1998 ............. G01B 7/284

OTHER PUBLICATIONS

Written Opinion for PCT/US2018/018589 dated Apr. 25, 2018 (7 pages).
(Continued)

*Primary Examiner* — Christopher W Fulton
(74) *Attorney, Agent, or Firm* — Conley Rose, P.C.

(57) ABSTRACT

A tool for evaluating a thread depth includes a frame having an elongate portion extending in a first direction; a first contact member coupled to the frame and reciprocable in a second direction between a baseline height and a retracted height, the baseline height being greater than the retracted height. An output device provides an output in response to the height of the first contact member. A reference member is coupled to the frame at a first distance D1 from the first contact member as measured in the first direction; and a second contact member coupled to the frame is disposed at a second distance D2 from the first contact member as measured in the first direction, such that D1 is greater than D2.

20 Claims, 10 Drawing Sheets

(51) Int. Cl.
*G01B 5/207* (2006.01)
*G01B 3/48* (2006.01)

(58) Field of Classification Search
USPC ..... 33/199 R, 1 BB, 501.11, 501.12, 501.17, 33/199 B
See application file for complete search history.

(56) References Cited

U.S. PATENT DOCUMENTS

| | | | | |
|---|---|---|---|---|
| 1,456,938 A | * | 5/1923 | Schoof | G01B 5/163 33/199 R |
| 2,622,336 A | | 12/1952 | Raout | |
| 3,082,538 A | * | 3/1963 | Theuerkauf | G01B 5/163 33/199 R |
| 4,330,944 A | * | 5/1982 | Maisenbacher | G01B 7/001 33/199 R |
| 4,559,711 A | * | 12/1985 | De Boynton | G01B 5/204 33/199 R |
| 4,567,670 A | * | 2/1986 | Roulstone | G01B 5/204 33/199 R |
| 4,672,750 A | | 6/1987 | Storace | |
| 4,947,555 A | | 8/1990 | Allen | |
| 4,965,937 A | * | 10/1990 | Hill | E21B 17/006 33/199 R |
| 5,182,862 A | * | 2/1993 | Frank | G01B 5/204 33/199 R |
| 2007/0214664 A1 | * | 9/2007 | Muradov | G01B 3/48 33/199 R |

OTHER PUBLICATIONS

International Search Report for PCT/US2018/018589 dated Apr. 25, 2018 (3 pages).
Cheever Elements of Translating Mechanical SYstems, Nov. 21, 2016 (8 Pages).

* cited by examiner

APPARATUS AND METHODS FOR MEASURING THREAD DEPTH ON A THREADED MEMBER

CROSS-REFERENCE TO RELATED APPLICATIONS

This application claims benefit of U.S. provisional patent application Ser. No. 62/460,727 filed Feb. 17, 2017, and entitled "Apparatus and Methods for Measuring Thread-Pullout on a Threaded Member," and PCT/US2018/018589 filed Feb. 19, 2018, and entitled "Apparatus and Methods for Measuring Thread-Pullout on a Threaded Member", which are hereby incorporated herein by reference in their entirety for all purposes.

STATEMENT REGARDING FEDERALLY SPONSORED RESEARCH OR DEVELOPMENT

Not applicable.

BACKGROUND

Field of the Disclosure

This disclosure relates generally to evaluating thread quality on machined tubular members. More particularly, it relates to an apparatus and system for measuring thread depth, which may include radial changes occurring axially, along a threaded tubular member. Still more particularly, this disclosure relates to identifying and measuring the axial location of thread pullout on a threaded tubular member.

Background to the Disclosure

The oil industry uses a variety of threaded tubular members, such as pipes, jar members, drill bits, bottom-hole assemblies, and the like. Various threaded tubular members include threads near one or both ends to couple two or more tubular members together end-to-end. Referring to FIG. 1 for an example, a drill pipe 50 has a central or longitudinal axis 51 and at a first end, has external or male threads 52 and one or more shoulders 54, 55 forming a "pin end" 56. The opposite end of drill pipe 50 has internal or female threads 62 and one or more shoulders 64, 65 forming a "box end" 66. Threads 62 are any type of thread that may be suitably configured to mate with threads 52. The pin end 56 and box end 66 may be threadingly coupled to a similar drill pipe or to another type of tubular member. In this example, threads 52, 62 are tapered. In more detail, pin end 56 includes an internal shoulder 54 at a terminal end of pipe 50 and an external shoulder 55 axially-spaced from shoulder 54. Internal and external shoulders 54, 55 are named based on their positions when "made-up" (i.e. coupled) with a box end. Starting adjacent shoulder 54 and extending toward shoulder 55, external threads 52 are formed in two portions 71, 72. In the first portion 71, threads 52 extend outwardly from a base region 74 on the root of the threads to a parallel crest region 75, such that threads of portion 71 are full-form with a uniform depth. Base region 74 indicates the bottom of the troughs of threads 52. In the second portion 72, threads 52 become shorter in depth due to the inclusion of a base region 76 that is angled more steeply from axis 51 than is base region 74 and due to a truncated, second crest region 77 that extends from region 75. Base region 76 is angled toward and ultimately intersects crest region 77. Crest region 77 results in the thread form being truncated as compared to the full-form threads that lie between the base region 74 and the parallel crest region 75. The starting location 78 of base region 76 is the ending location of base region 74. In second portion 72, threads 52 and base region 76 become steadily shallower as base region 76 extends from location 78 towards shoulder 55 and intersects crest region 77. The second portion 72, due to the inclusion of base region 76, may also be called the "pullout zone" of threads 52. Without limitation, during at least one method of manufacture, the cutter that is used to form the threads 52 progresses in a direction parallel to axis 51 away from shoulder 54, for example, and at the same time moves radially outward creating base region 74. As the cutter reaches and goes beyond the location 78, the cutter is withdrawn from the material, traveling radially outward from axis 51 at a steeper taper defined by base region 76, the cutter being "pulled-out" of the material of pipe 50 and ultimately ceasing to cut into pipe 50. Establishing or confirming the position of location 78 from shoulder 54 or another point of reference is of interest when fabricating or inspecting a threaded end of a tubular.

Referring still to FIG. 1, box end 66 includes an internal shoulder 64 and, at a terminal end of pipe 50, an external shoulder 65. Starting adjacent the external shoulder 65 and extending toward shoulder 64, internal threads 62 are formed in two portions 91, 92. In the first portion 91, threads 62 extend outwardly from a base region 94 to a parallel crest region 95, such that threads of portion 91 are full-form with a uniform depth. Base region 94 indicates the bottom of the troughs of threads 62. In the second portion 92, threads 62 become shorter in depth due to the inclusion of a base region 96 that is angled more steeply toward axis 51 than is base region 94 and due to a truncated, second crest region 97 that extends from region 95. Base region 96 is angled toward and ultimately insects crest region 97. Crest region 97 results in the thread form being truncated as compared to the full-form threads that lie between the base region 94 and the parallel crest region 95. The starting location 98 of base region 96 is the ending location of base region 94. In portion 92, threads 62 and base region 96 become steadily shallower as base region 96 extends from location 98 towards shoulder 64 and intersects crest region 97. The second portion 92, due to the inclusion of base region 96, may also be called the "pullout zone" of threads 62. Without limitation, during at least one method of manufacture, the cutter that is used to form the threads 62 progresses in a direction parallel to axis 51 away from shoulder 65, for example, and at the same time moves radially inward creating base region 94. As the cutter reaches and goes beyond the location 98, the cutter is withdrawn toward axis 51 at a steeper taper defined by base region 96. As a result, the cutter is "pulled-out" of the material of pipe 50 and ultimately ceasing to cut into pipe 50. Establishing or confirming the position of location 98 from shoulder 65 or another point of reference is of interest when fabricating or inspecting a threaded end of a tubular.

The starting locations 78, 98 of the thread pullout on pin end 56 and box end 66 are important dimensions when cutting the threads 52, 62, respectively. Considering the box end 66 as an example, in the thread pullout zone 96, the thread depth (or likewise, thread height) is constantly changing and such threads in zone 96 cannot mate with complete full-form threads of region 71 on pin end 56, where the thread height is greater. Hence, the location 98 where the threads of the box end 66 start pulling-out, determines how far the pin threads 52 can traverse axially into box end 66 freely or without undo restraint. The position of pullout starting location 78 on pin end 56 may be measured axially from pin external shoulder 55 and is designated in FIG. 1 by a pullout distance 79. The pullout starting location 98 for box end 66 may be measured axially from box external shoulder 65 and is designated by a pullout distance 99.

The distances 79, 99 of pull-out starting locations 78, 98 are difficult dimensions to inspect using conventional techniques, especially on the internal threads 62 of a box end. Within a box end, access for hand-held probes and measuring tools is limited by the internal diameters, and the operator's line-of-sight is limited as well. These limitations can result in different measurements being measured for the same threaded component, even when measured by the same inspector at different times. Consequently, it is challenging to measure accurately the pullout distances 79, 99, as is necessary to confirm proper thread length. Using a conventional thread pullout gage or method, it is quite possible that parts with incorrect thread pullouts lengths can be incorrectly labeled "GO" (good), and parts with correct thread pullouts can be incorrectly labeled "No-Go" (bad). It is believed that the equipment and methods disclosed herein will achieve thread measurement results that are more accurate and are statistically more consistent than can be achieved with a conventional thread pull-out gage or method.

Currently, manual inspection of the thread pullout is accomplished using two tools: a first tool for determining the pullout starting location 78, 98, and a second tool for measuring the pullout distances 79, 99, each measured from its selected reference location (e.g. shoulder 55, 65 respectively). After these measurements or evaluations, the pullout length is compared against a design, specified value. Commonly, the first tool is a thread profile gage, shaped like the full thread-form that it is designed to contact. However, in some instances the presence of external shoulder 55 in a pin end or the presence of internal shoulder 64 in a box end hinders the profile gages from "seating" correctly on the threads, thus leading to false readings, as previous mentioned. In addition, the presence of second crest regions 77 and 97 also causes false readings as the teeth of the profile gage cannot form a snug fit with the threads on the pin end 56 or box end 66. Even in cases where the profile gage location is interpreted correctly by the inspector, subsequently using the second tool, a caliper/depth micrometer or a linear scale, to measure the axial dimension along a tapered pipe threads from a reference location is cumbersome and error prone. The inspector must remember or mark the location where the first tool found the thread pullout to begin, i.e. location 78, 98. The inspector must then properly place the second tool to make a second, separate evaluation to measure the pullout distance from shoulder 55 for pin threads and from shoulder 65 for box threads.

BRIEF SUMMARY OF THE DISCLOSURE

These and other needs in the art are addressed in one embodiment by a tool for evaluating a thread depth for a tubular member. In an embodiment, a tool is configured to evaluate a thread depth of a tubular member having threads with a plurality of spaced apart troughs formed in part by a plurality of spaced apart thread roots. The tool includes a frame having an elongate portion extending in a first direction and includes a first contact member configured to contact a trough and coupled to the frame, the first contact member configured to reciprocate in a second direction between a baseline height relative to the elongate portion and a retracted height relative to the elongate portion, the baseline height being greater than the retracted height. The tool also includes an output device coupled to the first contact member and configured to provide an output in response to the height of the first contact member. The tool further includes a reference member coupled to the frame at a first distance D1 from the first contact member as measured in the first direction; and a second contact member configured to contact a trough and coupled to the frame, the second contact member disposed a second distance D2 from the first contact member as measured in the first direction. The distance D1 is greater than the distance D2.

Another embodiment is a tool for evaluating a thread depth dimension of a tubular member having threads with a plurality of spaced apart troughs formed in part by a plurality of spaced apart thread roots. The tool includes a frame having an elongate portion extending in a first direction; a first contact member configured to contact a thread root, mounted to the frame, and configured to reciprocate perpendicular to the first direction between a baseline height relative to the elongate portion and a retracted height relative to the elongate portion, the baseline height being greater than the retracted height; and an output device coupled to the sensor and configured to provide an output in response to the height of the first contact member. The tool further includes a reference member extending from the frame to a first height that is greater than the second height of the second contact member, the reference member being disposed at a first distance D1 from the first contact member as measured in the first direction and includes a second contact member configured to contact a thread root and mounted to the frame and extending to a second height from the elongate portion that is greater than the baseline height of the first contact member, the second contact member being disposed at a second distance D2 from the first contact member as measured in the first direction. The distance D1 is greater than the distance D2.

Another embodiment is a tool for evaluating a thread depth dimension of a tubular member having threads with plurality of spaced apart thread roots. The tool includes a frame having an elongate portion extending in a first direction; a first contact member configured to contact a first pair of adjacent thread roots and coupled to the frame, the first contact member configured to reciprocate in a second direction between a baseline height relative to the elongate portion and a retracted height relative to the elongate portion, the baseline height being greater than the retracted height; and an output device coupled to the first contact member and configured to indicate the height of the first contact member. The tool further includes a reference member coupled to the frame extending to a first height from the frame as measured in a third direction and includes a second contact member configured to contact a second pair of adjacent thread roots and coupled to the frame, the second contact member being disposed at a second height from the frame as measured in a fourth direction.

BRIEF DESCRIPTION OF THE DRAWINGS

For a detailed description of the disclosed exemplary embodiments, reference will now be made to the accompanying drawings.

NOTATION AND NOMENCLATURE

Figure 1:
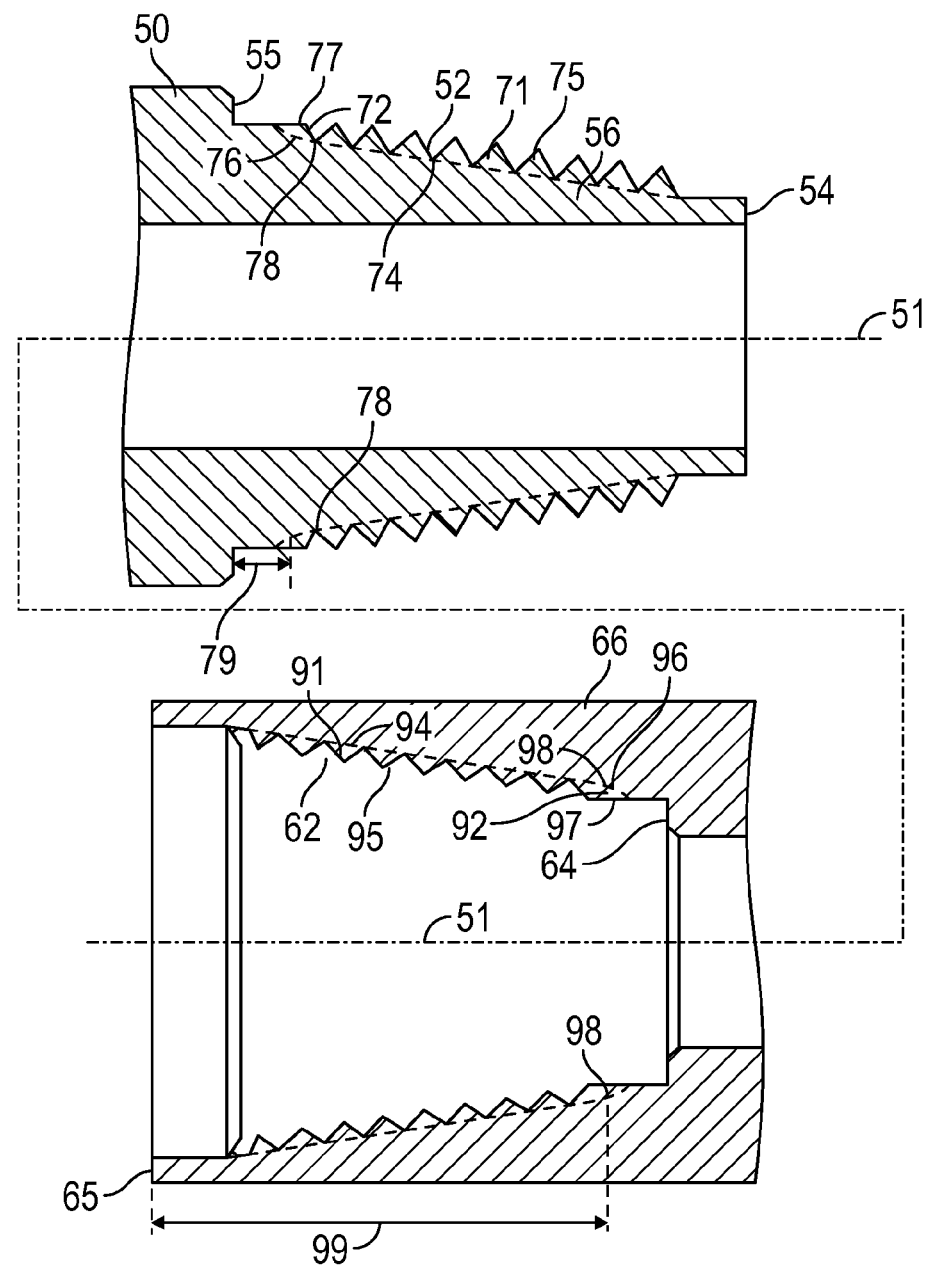
FIG. 1 shows a side view in cross-section of an embodiment of pipe having a threaded pin end and a threaded box end.

The following description is exemplary of certain embodiments of the disclosure. One of ordinary skill in the art will understand that the following description has broad application, and the discussion of any embodiment is meant to be exemplary of that embodiment, and is not intended to suggest in any way that the scope of the disclosure, including the claims, is limited to that embodiment.

The figures are not necessarily drawn to-scale. Certain features and components disclosed herein may be shown exaggerated in scale or in somewhat schematic form, and some details of conventional elements may not be shown in the interest of clarity and conciseness. In some of the figures, in order to improve clarity and conciseness, one or more components or aspects of a component may be omitted or may not have reference numerals identifying the features or components. In addition, within the specification, including the drawings, like or identical reference numerals may be used to identify common or similar elements.

As used herein, including in the claims, the terms "including" and "comprising," as well as derivations of these, are used in an open-ended fashion, and thus are to be interpreted to mean "including, but not limited to . . . ." Also, the term "couple" or "couples" means either an indirect or direct connection. Thus, if a first component couples or is coupled to a second component, the connection between the components may be through a direct engagement of the two components, or through an indirect connection that is accomplished via other intermediate components, devices and/or connections. The word "or" is used in an inclusive manner. For example, "A or B" means any of the following: "A" alone, "B" alone, or both "A" and "B."

In addition, the terms "axial" and "axially" generally mean along a given axis, while the terms "radial" and "radially" generally mean perpendicular to the axis. For instance, an axial distance refers to a distance measured along or parallel to a given axis, and a radial distance means a distance measured perpendicular to the axis. Furthermore, any reference to a relative direction or relative position is made for purpose of clarity, with examples including "top," "bottom," "up," "upper," "upward," "down," "lower," "clockwise," "left," "leftward," "right," and "right-hand." For example, a relative direction or a relative position of an object or feature may pertain to the orientation as shown in a figure or as described. If the object or feature were viewed from another orientation or were implemented in another orientation, it may be appropriate to describe the direction or position using an alternate term.

As used herein, including the claims, the plural term "threads" broadly refers to a single, helical thread path or to multiple, parallel helical thread paths, any of which may include multiple, axially spaced crests, troughs, and roots as viewed from the side. Of course, for embodiments in which the threads extend along a single helical thread path, adjacent troughs are helical extensions of each other as are adjacent crests.

DETAILED DESCRIPTION OF THE DISCLOSED EXEMPLARY EMBODIMENTS

This disclosure presents several embodiments of a thread inspection tool that is configured to evaluate a thread pullout dimension of a tubular member. Certain embodiments are capable of simultaneously determining the pullout starting location and measuring the distance of this location from a selected point of reference. In one embodiment, the thread inspection tool includes a probe and an indicator configured to evaluate or display the depth of a first portion of the thread's root relative to a second portion of the thread's root and, simultaneously, to evaluate or display the axial distance between the first portion of the threads and a reference location on the tubular member. In the figures, the various tool embodiments are configured for hand-held use, but machine-mountable configurations are contemplated as well.

A First Exemplary Embodiment

Figure 2:
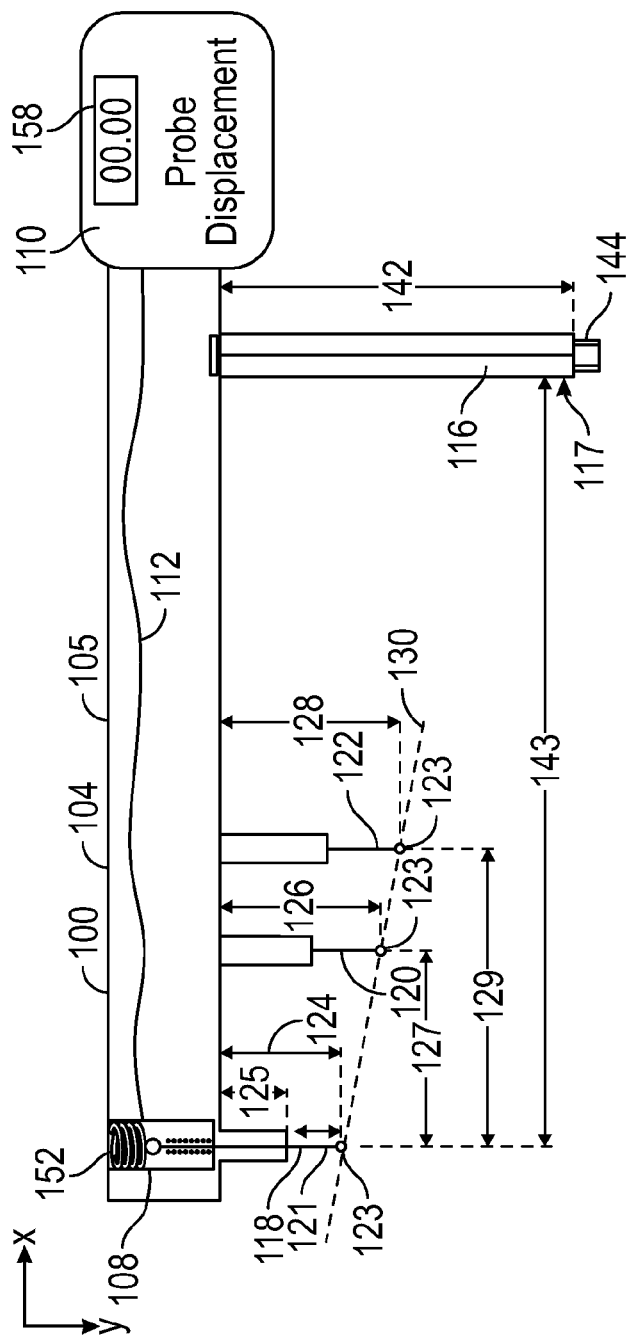
FIG. 2 shows a side view, partially in schematic form, of a first embodiment of a thread inspection tool configured for evaluating the pullout starting location of threads along a tubular member in accordance with principles described herein.

Referring to FIG. 2, a thread inspection tool 100 has an electric or an electronic coupling between a movable probe and an indicator. Tool 100 includes a housing or frame 104 having a body or elongate portion 105 extending in a first direction, which is indicated by an x-axis. Tool 100 further includes the following components mounted to the frame: a plurality of probes 118, 120, 122 extending away from portion 105 in a direction different than the x-direction, a position sensor 108 configured to sense the position of probes 118, an output device 110 mounted to frame 104 and electrically coupled to sensor 108 by an electrical wire 112, and an adjustable reference member 116 extending from frame 104. In this example, the three probes 118, 120, 122 extend from frame 104 in the y-direction, perpendicular to the x-axis.

Probe 118 is movable in the y-direction, and for thread comparison, probes 120, 122 are configured to be stationary during operation. Probes 120, 122 are spaced-apart from probe 118 and from each other in the x-direction. The three probes 118, 120, 122 each extend perpendicular to the x-direction. Each probe includes probe stem 121 and a probe tip 123 located at an end of stem 121. Each probe stem 121 is coupled to and extends from frame 104. Tips 123 are spaced-away in the y-direction from extending portion 105 of frame 104. Tips 123 are spherical or rounded, but other shapes are contemplated, such as a pointed or conical shape or well as a rounded-conical shape, as examples. The diameter or other characteristic size of tips 123 are chosen so that tips 123 reach in and contact the root or the base region of the root for selected type or types of threads that tool 100 is designed to evaluate. The "root" includes the bottom portion of a thread, as will be described in more detail when discussing FIG. 3, below. Throughout this disclosure and in the claims, discussion of the shape of a designated probe (such as a probe 118, 120, 122) or the height, distance, or location of the designated probe relative to another probe or relative to another object or feature refers to the tip 123 of the designated probe(s), unless some other reference feature is specifically stated. Tips 123, and therefore probes 118, 120, 122 themselves, are configured as contact members of tool 100, being designed to contact specific regions of the threads on tubular members.

Continuing to reference FIG. 2, Probe 118 is configured for reciprocating movement relative to frame 104, perpendicular to the x-direction, to allow for measurement of the depth of a thread root. Relative to the elongate portion 105 and tip 123, probe 118 is configured to reciprocate between an extended or baseline position indicated by height 124 and retracted position indicated by height 125. (Note: height refers to a measurement perpendicular to the x-direction whether that measurement is shown to be above or below a portion of frame 104 in a figure.) In this example, height 124 corresponds to the maximum distance that probe 118 can travel, and height 125 corresponds to the minimum distance of probe 118 from portion 105. The variable height of probe 118 configures probe 118 to measure thread depth and changes to thread depth that may occur in the axial direction along a tubular member. Probe 118 is configured to contact the thread root, possibly maintaining contact with the base region of the root, for example.

Comparison probe 120 extends from the elongate portion 105 of frame 104 to a predetermined height 126 that is greater than the height 124 of probe 118. Probe 120 is spaced-apart from probe 118 by a predetermined distance 127 as measured in the x-direction along the length of the elongate portion 105. Comparison probe 122 extends from the elongate portion 105 of frame 104 to a predetermined height 128 that is greater than height 126 of probe 120. Probe 122 is spaced-apart from probe 118 by a predetermined distance 129 in the x-direction. Distance 129 is greater than distance 127. The heights and distances of probes 118, 120, 122 are measured to/from their tips 123. The two tips 123 of probes 120, 122 are collinear and lie on a line 130 that is tapered with respect to the x-direction of frame portion 105. When probe 118 is extended to height 124, all three tips 123 of probes 118, 120, 122 are collinear. In general, the taper of line 130 is selected to match the taper of the base region of the threads that tool 100 is designed to evaluate. The heights 126, 128 and distances 127, 129 of the stationary probes 120, 122 are set at fixed values during manufacture or prior to using tool 100 to evaluate threads. Even so, in some embodiments, the values of measurements 126, 127, 128, 129 may be adjusted when preparing to use tool 100 and remain as fixed values while an evaluation of thread quality is performed. Thus, even adjustable embodiments include at least one configuration in which probes 120, 122 are stationary, held in fixed position relative to frame 104, and probe 118 remains movable, capable of reciprocation, in the y-direction as described. In various embodiments, probes 118, 120, 122 are longer or shorter in the y-direction, as may be advantageous for a particular type of thread that is to be inspected or to account for changes in the x-distances between the probes.

Continuing to reference FIG. 2, reference member 116 extends in the y-direction from the frame to a height 142 that is greater than the height 128 of probe 122 and thus greater than the heights of the other two probes 118, 120 as well. Member 116 includes a contact surface or surface region 117 that faces probes 118, 120, 122 and is perpendicular to the x-direction and thus parallel to the extending length of the probes. Reference member 116 is positioned at a predetermined, but adjustable, distance 143 from probe 118 as measured in the x-direction. More specifically, distance 143 measures from probe 118 to contact surface 117. Distance 143 is greater than distance 129 of probe 122 and thus greater than distance 127 of probe 120. Distance 143 will also be called an "inspection distance." Member 116 includes a fastener 144 configured to fix the position of the member 116 with respect to probe 118.

Sensor 108 is configured to detect or determine the variable height (i.e. the y-position) or change in height of probe 118 and, more specifically, the variable height of tip 123 and to communicate data indicative of the sensed position to the output device 110 via wire 112. In FIG. 2, sensor 108 is exemplified by a LVDT (linear variable differential transformer) and includes a spring 152 or another resilient, biasing member that biases probe 118 to extend away from the frame portion 105 or toward baseline position of probe 118, which is indicated by height 124. Output device 110 is configured to provide an output on a display 158 in response to the probe height data received from sensor 108. In FIG. 2, display 158 is configured to indicate the amount of displacement of probe 118 (e.g. tip 123) from its baseline position along line 130. The displayed output may be calibrated in engineering units such as millimeters or inches or calibrated as a percent of maximum displacement, based on the difference between the heights 124, 125, as examples.

A Second Exemplary Embodiment

Figure 3:
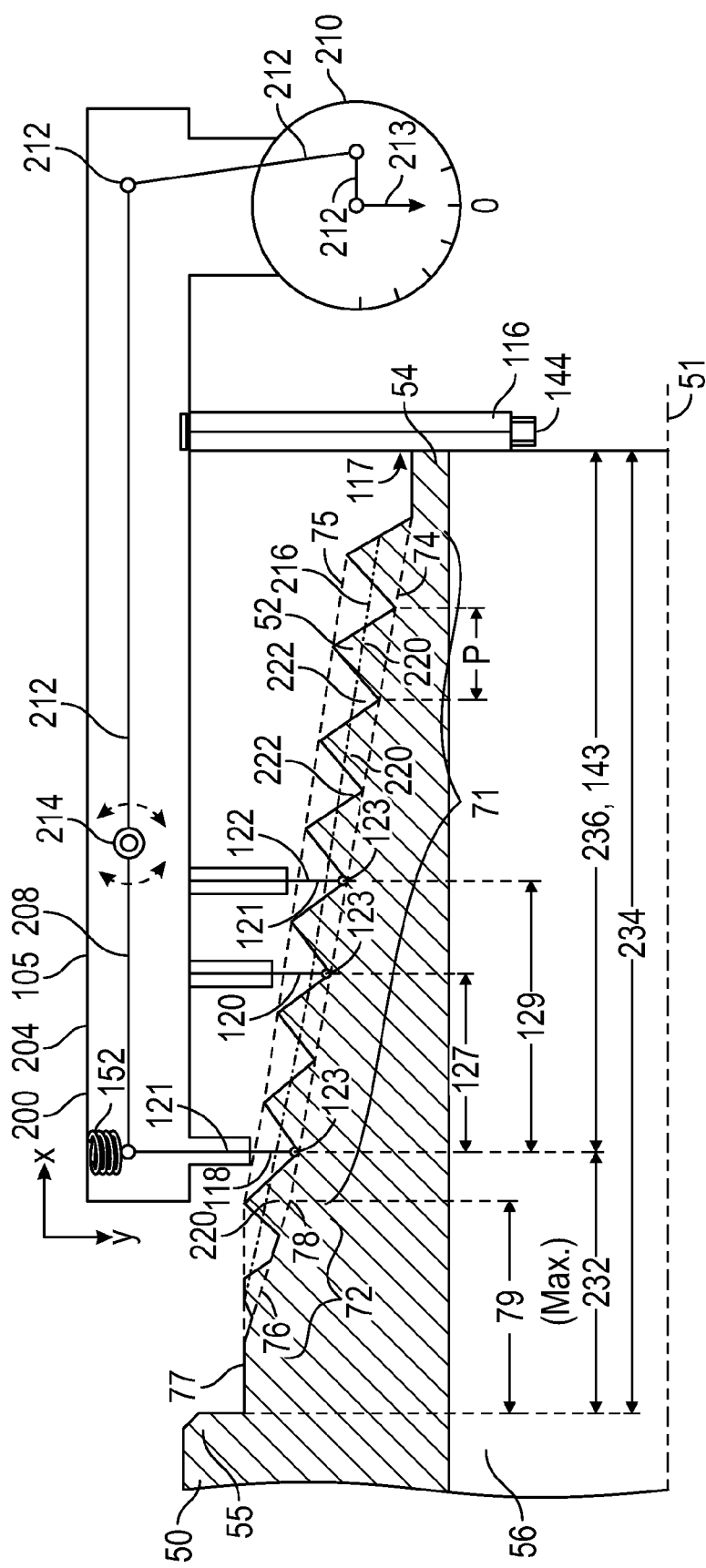
FIG. 3 shows a side view, partially in schematic form, of a second embodiment of a thread inspection tool configured for evaluating the pullout starting location of threads along a tubular member in accordance with principles described herein; The tool is shown inspecting the properly-threaded pin end of FIG. 1, a quarter of which is shown in cross-section.

Referring now to FIG. 3, in a second embodiment, a thread inspection tool 200 has a mechanical coupling between a movable probe and a probe position indicator. Tool 200 includes a housing or frame 204 having an elongate portion 105 extending in a first direction, which is indicated by an x-axis, and includes a plurality of probes 118, 120, 122 and an adjustable reference member 116 mounted to frame 204 and extending away from portion 105 in a direction different than the x-direction. Again, the probes include a reciprocating probe 118 and two comparison probes 120, 122, which may be adjustable, but are configured to be stationary during operation. In various embodiments, probes 118, 120, 122 and reference member 116 are arranged and configured for positioning on tool 200 as they are on tool 100 (FIG. 2). For example, each probe 118, 120, 122 includes probe stem 121 and a probe tip 123 located at an end of stem 121, distal to the extending portion 105 of frame 204 and configured as previously described. Tips 123, and therefore probes 118, 120, 122, are configured as contact members of tool 200, being designed to contact specific regions of the threads on tubular members. The heights 124, 125, 126, 128 and distances 127, 129, 143 shown in FIG. 2 pertain to the similar features in FIG. 3.

Referring still to FIG. 3, tool 200 further includes mechanical coupling or linkage 208 that connects reciprocating probe 118 to an output device 210 mounted to frame 204. In this embodiment, output device 210 is a dial indicator with a needle 213, but a digital indicator could also be used. Mechanical linkage 208 includes a plurality of interconnected linkage members 212 pivotally coupled to frame 204 at an axis 214. With this arrangement, probe 118 is configured to reciprocate in the y-direction. Spring 152 or another resilient member biases probe 118 to extend toward its baseline position, which is indicated by height 124 (See FIG. 2 for reference.). Output device 210 is configured to provide an output in response to the amount of displacement of probe 118 (e.g. tip 123) from its baseline position. In this example, the output is indicated by needle 213.

The use of tool 200 to evaluate the threads of a tubular member will be discussed with respect to the example of tapered, pin end threads 52 of pipe 50 in FIG. 3, which is similar or identical to pipe 50 of FIG. 1. It should be understood that tool 100 is configured to perform the same evaluations of thread pullout as will be described here for tool 200. In FIG. 3, tool 200 is shown positioned along the threads of pin end 56 with the x-axis that defines the orientation of frame 204 aligned parallel or substantially parallel to pipe axis 51. The y-direction of tool 100 extends radially with respect to pipe 50. As described above, threads 52 include a first portion 71 and a second portion 72. In depth, the first portion 71 extends from a base region 74 to a parallel crest region 75, such that threads 52 of portion 71 are full-form. The threads 52 of the second portion 72 become shorter in depth due to the inclusion of a thread base region 76 that is angled toward the adjacent crest regions 75, 77. Base region 76 ultimately intersects a crest region 77. The ending location of base region 74 is the starting location 78 of base region 76, where threads 52 begin to pullout of pipe 50, becoming increasingly shallower. In addition, FIG. 3 shows more detail of threads 52, including a pitch region 216 (shown as a dashed line in the side view) located between the parallel base region 74 and crest region 75 and including an exemplary triangular thread profile. Pitch region 216 is shown as a dashed line in the cross-sectional view. The lines that are used to indicate the regions 74, 75, 76, 77, 216 in the two-dimensional drawing of FIG. 3 represent conical or cylindrical surfaces in pin end 56. A thread root will be defined to include the portion of a thread that lies below pitch region down to and including the corresponding base region. For example, a thread root 220 includes the portion of the thread 52 disposed below pitch region 216 down to and including the corresponding base region 74, 76 in thread portions 71, 72. The trough 222 of a thread 52 includes the space between one side of a thread root 220 and the facing side of an adjacent thread root 220. Threads 52, including their profile, are exemplary. Threads 52 may be replaced by any of a variety of thread, including, as an example, frustoconical threads, which include truncated crests and troughs.

Continuing to reference FIG. 3 and considering the threads 52 of pin end 56 further, pullout starting location 78 is located at distance 79 from external shoulder 55, as-built. A typical design specification for pin end 56 requires that the pullout distance 79 be less than or equal to a maximum pullout distance 232, measured from external shoulder 55:

Specification: Distance 79 [actual value]≤Distance 232 [max. design value]      1

Pin end 56 is also characterized by a pin end length 234 that extends from internal shoulder 54 to external shoulder 55.

Tool 200 may be used to determine whether or not the specification of Equation 1 has been achieved. In order to evaluate the thread pullout starting location and its pullout dimension (e.g. distance 79) of pin end 56 using tool 200, an inspection distance 236 is calculated as the difference between pin end length or distance 234 and the maximum pullout distance 232, as shown in Equation 2:

Inspection Distance 236=Distance 234−Distance 232     2

Use of Equation 2, assumes that pin end length 234 has been properly achieved. In most cases, the dimensional measurement of pin end length 234 is performed as part of the overall inspection of the pin member of pipe 50.

For a thread pullout inspection, the location of reference member 116 on tool 200 is adjusted so that the distance 143 between member 116 and reciprocating probe 118 is equal to the calculated inspection distance 236, as summarized here in Equation 3:

Position for member 116: Distance 143=Distance 236     3

If, instead, the requirement for pullout starting location 78 on pin end 56 were specified by a distance from internal shoulder 54 or from another reference location, and the position of member 116 could be determined appropriately for that situation.

Continuing to reference FIG. 3, the x-distances 127, 129 between the various probes of tool 200 are equal to or are integral multiples of the thread pitch "P", which is measured parallel to the longitudinal thread axis 51. As an example, in FIG. 3, the distance 127 between probes 118, 120 is equal to twice the pitch P, and distance 129 between probes 118, 122 is equal to three-times the pitch P. Other values of probe the spacing distances 127, 129 are possible. Either of the distances 127, 129 may be selected to be equal to pitch P, two times pitch P, or another multiple of pitch P. Distance 127 may be set equal to distance 129.

As shown in FIG. 3, during an inspection of pin end 56, probes 118, 120, 122 are positioned within various adjacent or generally adjacent troughs of threads 52. When configured and arranged in a preferable fashion with respect to threads 52, each probe 118, 120, 122 (that is to say each tip 123) touches a separate, axially spaced trough 222 in in thread portion 71, making contact below the pitch region 216, preferably contacting the bottom of trough 222, and each probe symmetrically touches the two adjacent roots 220 that form the corresponding trough 222. The x-axis of tool 200 is held parallel to pipe axis 51 by the simultaneous contact of probes 120, 122 against the thread roots. In the preferable arrangement described above, because each probe 118, 120, 122 touches two adjacent roots 220, each probe contacts threads 52 below the pitch region 216. Moreover, in this example, the entirety of each probe tip 123 is located below pitch region 216. FIG. 3 shows a preferred placement of tool 200 with respect to threads 52 during an inspection. In various other embodiments of tool 200, probes having a different size or shape relative to the shape of threads 52 sit differently within the threads while making contact below the pitch region.

Initially when probes 118, 120, 122 are positioned within threads 52, contact surface 117 of reference member 116 may be spaced apart from internal shoulder 54. This situation may occur prior to the configuration shown in FIG. 3. In such a situation, tool 200 may travel along the helical thread path, with probes 118, 120, 122 sliding within of the thread troughs 222 that they contact. In other words, tool 200 is caused to rotate about pin end 56 while maintaining contact with external threads 52. Optionally, probes 118, 120, 122 could be made to jump over the threads in order to move parallel to axis 51. Eventually, reference member 116 contacts shoulder 54 as shown in FIG. 3, and the evaluation of thread pullout starting location 78 can be accomplished. In FIG. 3, probe 118 does not reach or contact the base region 76 and location 78. Instead, probe 118 is located in a thread trough of the first region 71, which is defined by the full-depth base region 74. As a result, probe 118 remains extended in the y-direction, maintaining its height 124 (FIG. 2) relative to the elongate portion 105, and needle 213 on output device 210 has not moved and continues to point to zero displacement. Based on this result, it may be concluded that distance 79 is less than the specified, maximum pullout distance 232; therefore, in respect to pullout, the threads 52 are properly formed on pin end 56. Thus, pin end 56 passes inspection, achieving what is sometimes called a "Go" condition.

Thus, the single tool 200 is configured to accomplish simultaneously two tasks. The new process involves placing tool 200 within threads 52 and, if necessary, rotating tool 200 along the threads until reference member 116 contacts the internal shoulder 54 at the pin end 56. By this process, the thread pullout is evaluated. The process has completed these two tasks: (1) the position of thread pullout starting location 78 has been identified (For FIG. 3, location 78 is: beyond probe 118 with respect to shoulder 54.), and (2) the pullout dimension 79 of location 78 has been determined to be less than the maximum distance 232, which is the "Go" condition.

By contrast, using a conventional process not involving tool 200, an operator would first locate the approximate thread pullout starting location 78, determining "here it is." The operator would mark it, remembering it, or use one hand to hold the first tool in-place, trying not to forget or not to move his hand. This first task is typically done with a first conventional tool, such as a thread profile gage. Once this first task is completed, the conventional evaluation would then involve measuring the distance from the shoulder 55 to the location 78, using a second conventional tool, such as a caliper/depth micrometer or a linear scale. Thus, the conventional process involves attempting to find precisely the pullout starting location 78 and, subsequently, attempting to measure the pullout dimension within a prescribed range of accuracy, thereby introducing various sources of error into the measurement process.

Using tool 200 does not require that location 78 be precisely identified and measured. Instead, at least in the embodiment described above, an operator focuses on measuring the specified inspection distance 236 by moving tool 200 along the threads 52, and simultaneously probe 118 makes a radial measurement of the depth of the thread root 220. The resulting height or displacement of probe 118, which corresponds to the depth of the root 220, is displayed as a value on output device 210. Based on the displayed value, the operator evaluates the general position of pullout starting location 78, determining whether it is axially distal (beyond) or axially proximal to shoulder 54 as compared to probe 118. However, in some instances the location 78 may be precisely identified. For example, an operator may move tool 200 along the helical path of threads 52 until output device 210 just begins to display a value greater than zero and conclude that probe 118 rests on or immediately adjacent location 78. This situation may occur before or when member 116 contacts shoulder 54.

Figure 4:
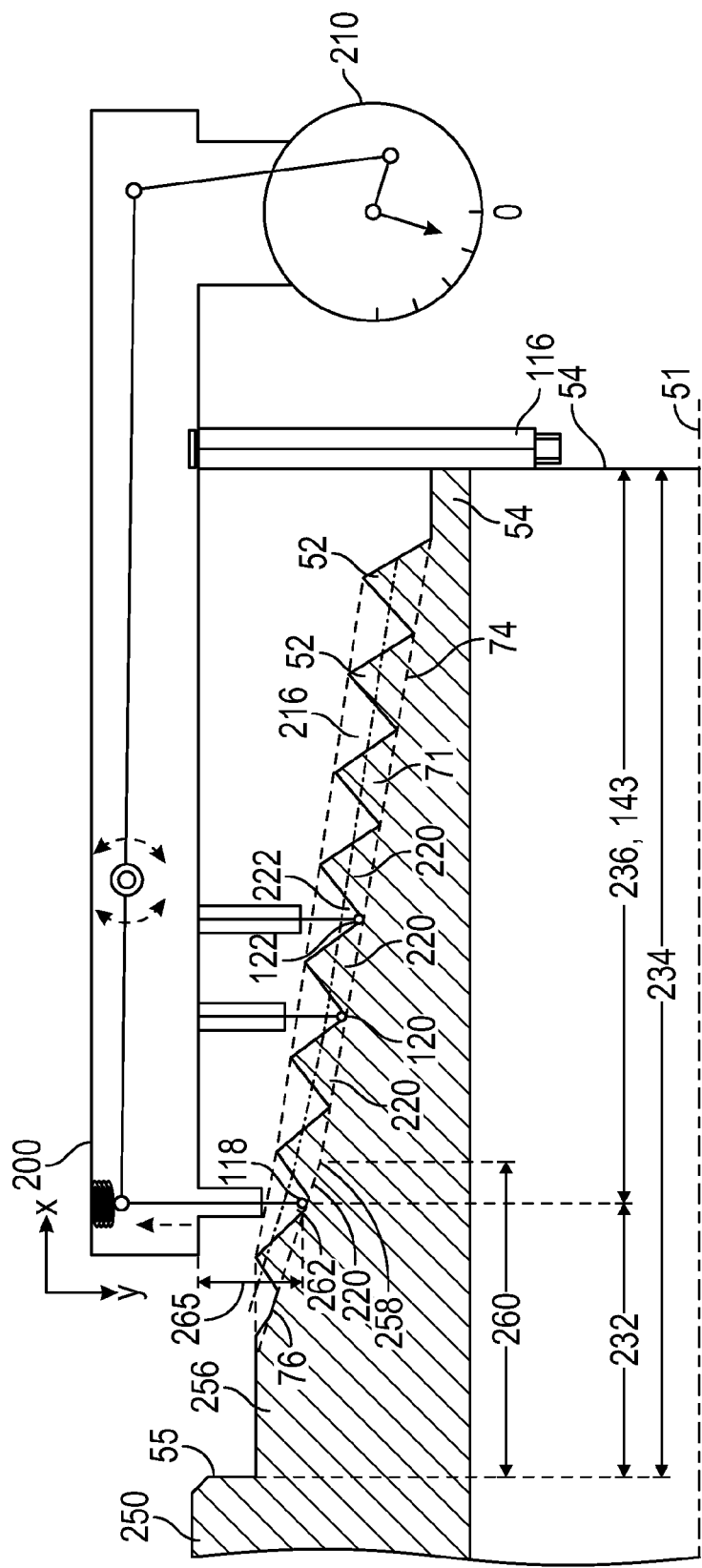
FIG. 4 shows the thread inspection tool of FIG. 3 inspecting an improperly-threaded pin end, a quarter of which is shown in cross-section.

Referring now to FIG. 4, tool 200 is shown inspecting a pipe 250 with a pin end 256 having a thread pullout distance 260 that is longer than the maximum pullout distance 232. The central or longitudinal axis of drill pipe 250 is again designated by the reference number 51. Pin end 256 includes an internal shoulder 54 at a terminal end of pipe 250, an external shoulder 55 axially-spaced at a distance 234 from shoulder 54, and external or male threads 52 located partway between shoulders 55, 54. Distance 234 may also be called the pin end length. In general, the configuration of threads 52 of FIG. 4 are the same as threads 52 of FIG. 3, except for the placement of thread pullout starting location 258, which effects the number of crests or troughs. For example, threads 52 of FIG. 4 may have any of the thread-forms (i.e. cross-sectional shapes) that threads 52 of FIG. 3 may have. As drawn in FIG. 4, at least in portion 71 along base region 74, the thread-form of threads 52 is identical to the thread-form of threads 52 of FIG. 3. As a result of manufacturing, thread pullout starting location 258 in FIG. 4 is positioned at the distance 260 from external shoulder 55.

In this example shown in FIG. 4, the same design specification will be used for pin end 256 as was used for pin end 56, as per Equation 2. When applied to pin end 256, the specification requires that the pullout distance 260 be less than or equal to a maximum pullout distance 232, measured from external shoulder 55. The specification is thus stated as:

$$\text{Specification: Distance } 260 \leq \text{Distance } 232 \text{ [max. design value]} \quad 4$$

In preparation for a thread inspection, the location of reference member 116 on tool 200 is adjusted so that the distance 143 between member 116 and reciprocating probe 118 is equal to the calculated inspection distance 236, which is evaluated according to Equation 2, above. Thus, the placement of member 116 is stated in Equation 3, above.

While inspecting pin end 256, probes 118, 120, 122 of tool 200 are positioned within various adjacent or generally adjacent troughs of threads 52, preferably making contact below the pitch region 216, as described above. Initially, contact surface 117 of reference member 116 may be spaced apart from internal shoulder 54. If this is the starting condition, then at least to achieve the configuration of in FIG. 4, tool 200 is caused to rotate about pin end 256 while preferably maintaining contact with the roots of external threads 52 until reference member 116 contacts shoulder 54, as shown. When configured and arranged in a preferable fashion, each of the comparison probes 120, 122 touches a separate trough 222 in thread portion 71, making contact below the pitch region 216, preferably contacting the bottom of trough 222. Consequently, each stationary probe touches the two adjacent roots 220 that form the corresponding trough 222. In FIG. 4, probe 118 is positioned axially beyond (i.e. to the left of) the thread pullout starting location 258 and touches the root 220 of threads 52 that lies along base region 76. Probe 118 is positioned within a partial depth trough 262 that is located along the pullout zone of base region 76. As a result, probe 118 has been forced to retract into or towards frame portion 105, traveling to a height 265 that is less than the height 124 (labeled in FIG. 2; also shown but not labeled in FIG. 3). As a result, needle 213 on output device 210 has moved and points to a displacement value greater than zero. In this manner, tool 200 indicates that the distance 260 is greater than the specified maximum pullout distance 232:

$$\text{As-Built: Distance 260} > \text{Distance 232} \qquad (5)$$

The pullout starting location 258 of pin end 256 does not meet the specified requirements of Equation 4. Thus, threads 52 of pin end 256 fail to pass inspection. This may be called a "No-Go" condition.

Still referring to FIG. 4, in the evaluation method previously described, reference member 116 contacted internal shoulder 54 at the terminal end of pin end 256 prior to making the evaluation of pullout starting location 258. In some other instances, the evaluation of the same pin end 256 may be concluded sooner. For example, using the same pin end 256 and same tool 200, probes 118, 120, 122 may again be placed within various troughs 222 along the helical path of thread 52. Again, the position of the reference member 116 is initially spaced-apart from internal shoulder 54, and output device 210 displays a zero reading. The tool 200 would then be moved or rotated relative to pin end 256, reducing the distance between member 116 and shoulder 54. However, before these components 116, 54 make contact; probe 118 will begin to retract. Probe 118 will begin to retract when it reaches the portion of the trough that passes over or intersects the location 258, where, due to manufacturing, the trough begins to rise along the pullout region 76. (Note: The marked location 258 actually represents a conceptualized circle that is centered on axis 51 and is located in a radial plane between the shoulders 54, 55. The helical trough of threads 52 crosses this circle, i.e. location 258, at a point that is, in a strict sense, "the thread pullout starting location". The circle or location 258 includes this intersection point and extends circumferentially around the tubular member as a means for evaluating thread pullout when tool 200 (or another tool herein) is disposed at any circumferential location. Thus, in at least some instances, it is not necessary that tool 200 find the intersection point of location 258 and thread base region 74 in order to make an evaluation of thread pullout.) The retraction of probe 118 causes output device 210 to begin to register a non-zero displacement reading. When the inspector or the machine that is performing the evaluation first observes the non-zero displacement reading on output device 210, the evaluation may be concluded, even before reference member 116 contacts shoulder 54. Again, tool 200 would indicate the "No-Go" condition of pin end 256.

In some other instances using pin end 256 or a similar pin end, the initial placement of the probes within the threads 52 may result in a displacement reading on output device 210 that is greater than zero even when without reference member 116 contacting internal shoulder 54. The evaluation may be concluded due to the non-zero reading of output device 210, again indicating the "No-Go" condition of pin end 256. Other pin ends having pullout starting locations 258 positioned differently relative to shoulder 55 or shoulder 54 may follow one of the described methods of operation of tool 200 or may be inspected with tool 200 using a modification of the described methods.

A Third Exemplary Embodiment

Figure 5:
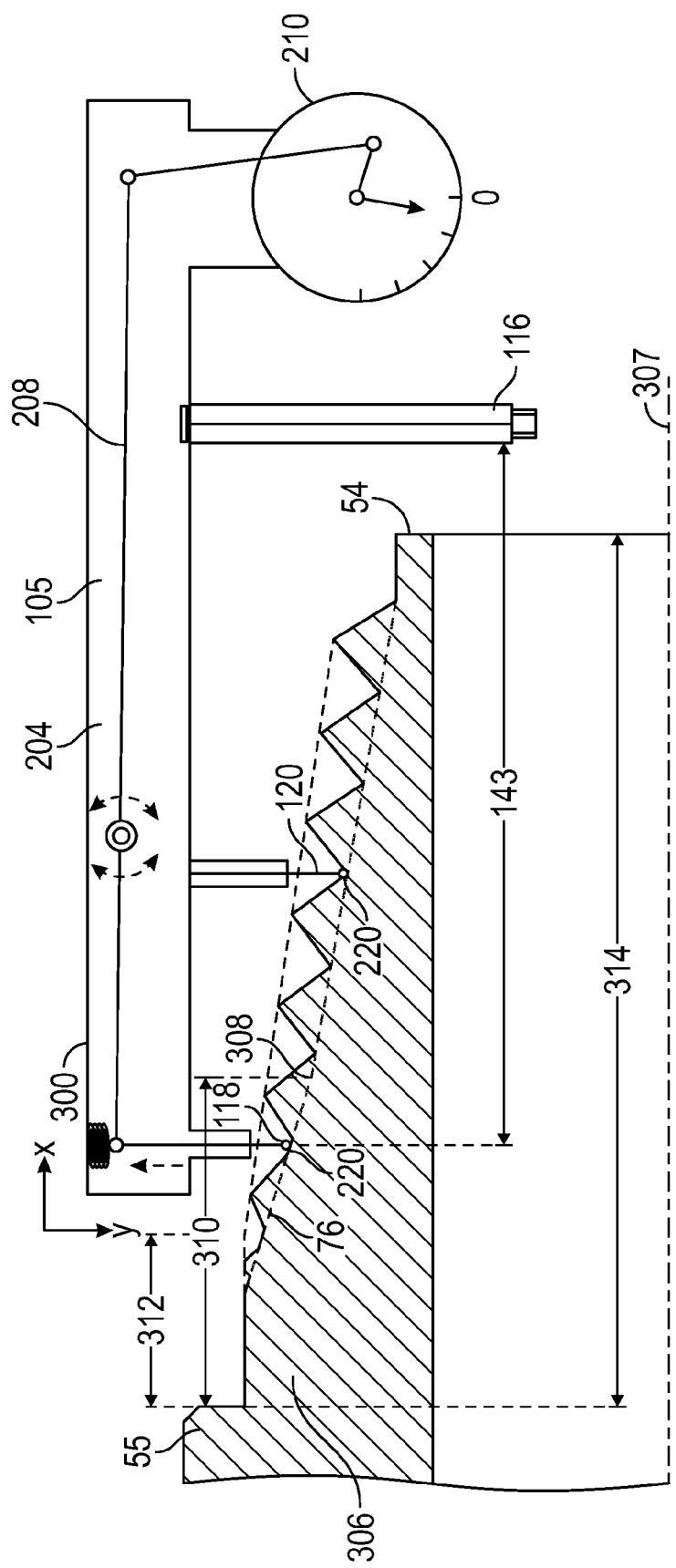
FIG. 5 shows a side view, partially in schematic form, of a third embodiment of a thread inspection tool configured for evaluating the pullout starting location of threads along a tubular member in accordance with principles described herein; The tool is shown inspecting an improperly-threaded pin end, a quarter of which is shown in cross-section.

FIG. 5 shows a tool 300 that has a mechanical coupling between a movable probe and a probe position indicator. Tool 300 includes several features similar to tool 200, including a mechanical coupling between a thread probe and a probe position indicator. Tool 300 is configured for handheld use. Like tool 200, tool 300 includes a housing or frame 204 having an elongate portion 105 extending in a first direction, which is indicated by an x-axis, and includes a movable contact member or probe 118, a contact member or probe 120 for comparison, and an adjustable reference member 116 mounted to frame 204 and extending away from portion 105 in a direction different than the x-direction. Probes 118, 120 are configured as previously described. Probe 118 is coupled by a mechanical linkage 208 to an output device 210 mounted to frame 204 The heights 124, 125, 126 and distances 127, 143 shown in FIG. 2 pertain to the similar features in FIG. 5.

Also in FIG. 5, a pipe pin end 306 includes a central or longitudinal axis 307, an internal shoulder 54, an external shoulder 55, and threads 52 As a result of manufacturing, a thread pullout starting location 308 is positioned at an axial distance 310 from external shoulder 55. In general, threads 52 are the same as previously described regarding earlier figures, except for location 308. A maximum pullout dimension 312 is specified for this pin end 306, measured axially from shoulder 55. Pin end 306 has a length 314 that extends from internal shoulder 54 to external shoulder 55.

With various distances marked in FIG. 5, it is evident that the thread pullout starting location 308 is too far from shoulder 55 so that distance 310 is greater than the maximum specified pullout dimension 312. However, the comparison of dimensions 310, 312 is typically not obvious until an inspection process is performed on pin end 306. In FIG. 5, probes 118, 120 of tool 300 are positioned within the roots of threads 52 of pin end 306. Per the principle of Equation 2, the distance 143 between reference member 116 and probe 118 on tool 300 has been pre-set to an appropriate inspection distance based on a maximum pullout distance 312 and pin end length 314 that are specified for this pin end 306. The x-axis and elongate portion 105 of tool 300 are parallel to pin end central axis 307. In some instances, the inclusion of one stationary probe 120 rather than a plurality of stationary probes may complicate the process of achieving or maintaining the parallel orientation of elongate portion 105 relative to axis 307. Due to the excess distance 310 of pullout starting location 308 from shoulder 55, probe 118 registers a height displacement relative to its fully extended position, even without reference member 116 contacting shoulder 54. The height-displacement of probe 118 is evident by the non-zero value shown on output device 210. This is a "No-Go" condition, and threads 52 of pin end 306 fail to pass inspection.

Evaluation of Box Ends on Tubular Members

Figure 6:
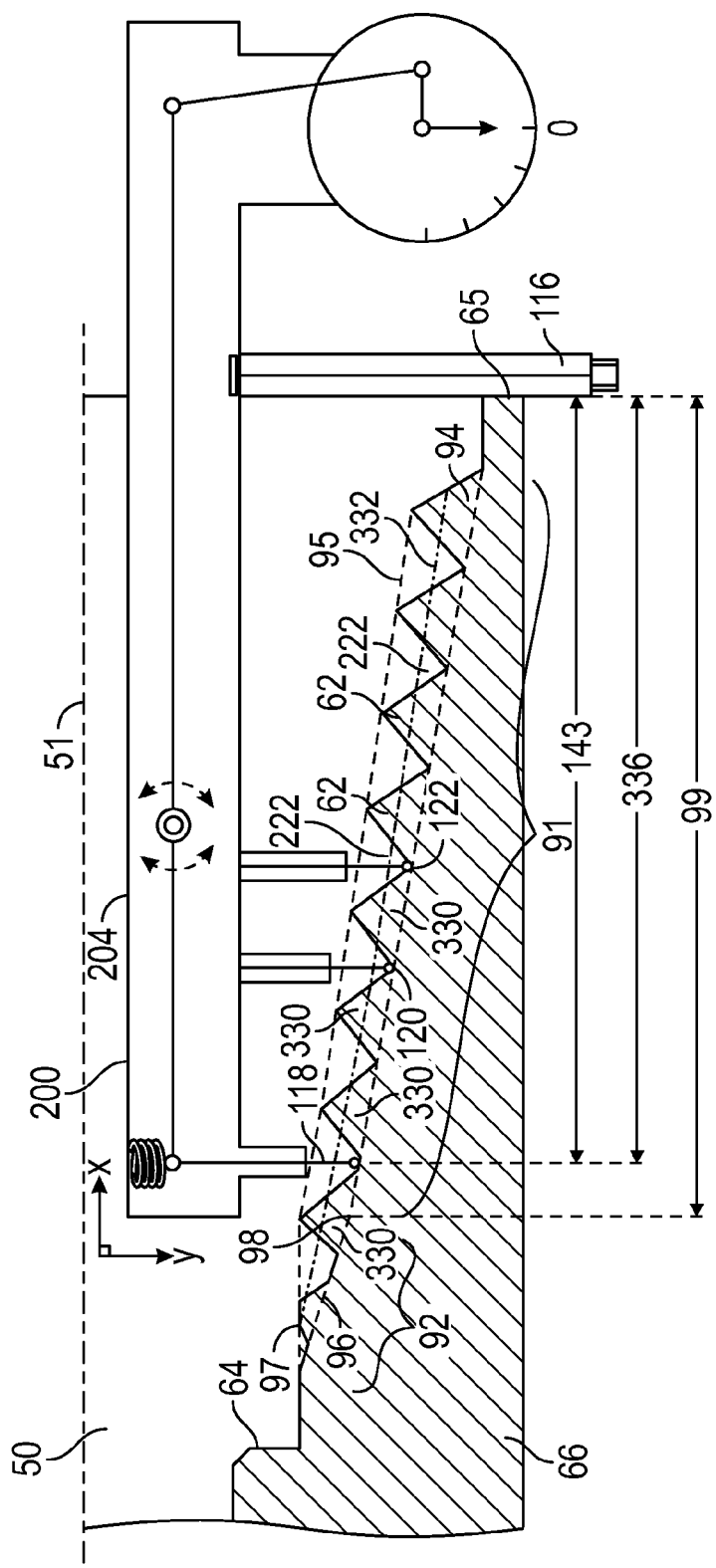
FIG. 6 shows the thread inspection tool of FIG. 3 inspecting the properly-threaded box end of FIG. 1, a quarter of which is shown in cross-section.

FIG. 6 shows thread inspection tool 200, previously described, inspecting the box end 66 of pipe 50 from FIG. 1, which has an acceptable thread pullout distance. Continuing to reference FIG. 6, a pitch region 332 is located between the parallel base region 94 and crest region 95. Pitch region 332 identifies at least a portion of the roots 330 of threads 62, which lie below pitch region 332 down to and including the corresponding base region 74, 76 in in thread portions 91, 92. The as-built position of pullout starting location 98 and its pullout distance 99 are marked in FIG. 6. For box end 66, a minimum pullout distance 336 was specified prior to manufacturing. Distance 336 specifies the minimum axial spacing between external shoulder 65 and location 98:

$$\text{Specification: Distance 99 [actual value]} \geq \text{Distance 336 [min. design value]} \qquad (6)$$

Distance 336 is measured from an outermost end of pipe 50, i.e. shoulder 65, and reference member 116 of tool 200 is configured to butt against an outermost end of pipe 50, at least with the embodiment of tool 200 that is shown. Therefore, distance 336 is the appropriate inspection distance for tool 200. Consequently, the location of reference member 116 on tool 200 is adjusted and fixed so that the distance 143 between reciprocating probe 118 and surface 117 of reference member 116 is adjusted to be equal to the specified, minimum pullout distance 336:

Position for member 116: Distance 143=Distance 336  7

If, instead, the requirement for pullout starting location 98 were specified by a distance from a surface other than shoulder 65, the position of member 116 could be determined appropriately for that situation.

Continuing to reference FIG. 6, the x-axis of tool 200 is aligned parallel to pipe axis 51 so that probes 118, 120, 122 extend radially with respect to pipe 50. Probes 118, 120, 122 are positioned within troughs 222 and contact roots 330 of thread portion 91 inside box end 66. The longitudinal placement of tool 200 with respect to axis 51 causes surface 117 of reference member 116 to contact the external shoulder 65. Output device 210 displays a zero displacement value. Based on these results, distance 99 is greater than the specified minimum pullout distance 336; therefore, in respect to pullout, the threads 62 are properly formed. Thus, box end 66 passes inspection, achieving a "Go" condition.

Figure 7:
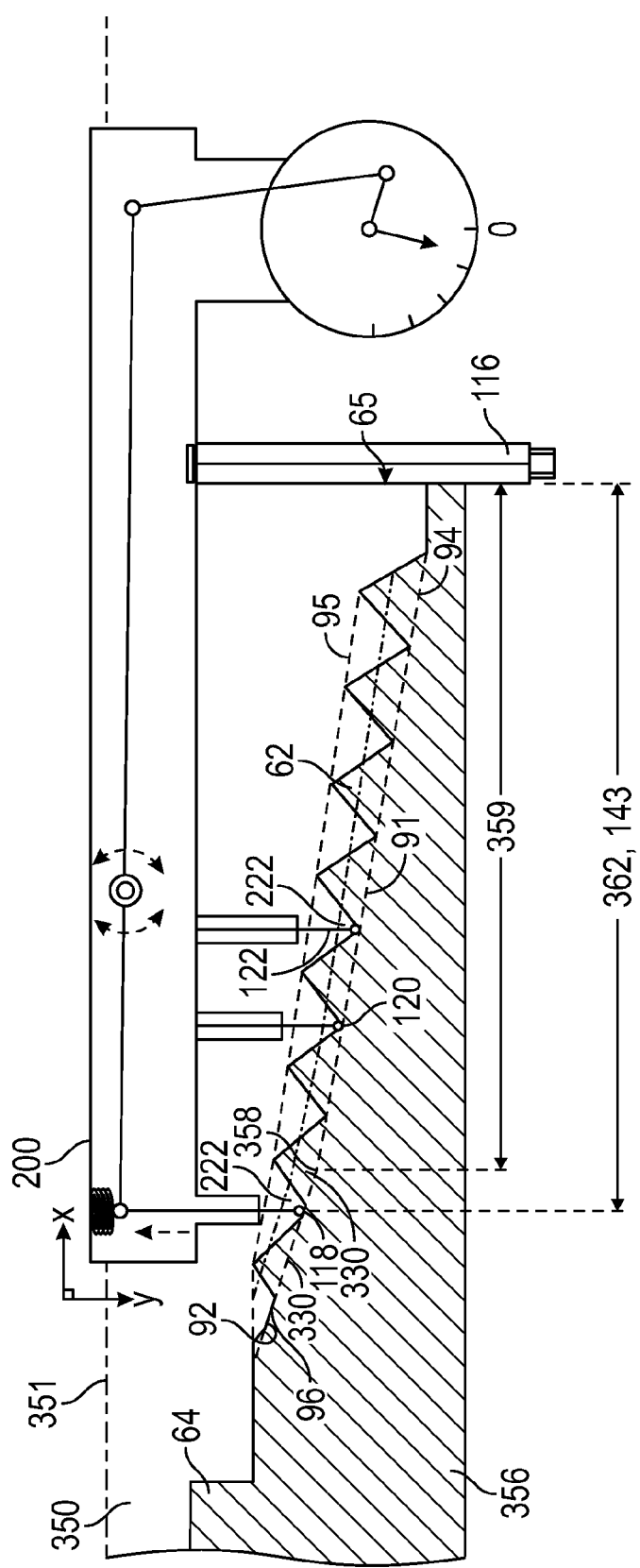
FIG. 7 shows the thread inspection tool of FIG. 3 inspecting an improperly-threaded box end, a quarter of which is shown in cross-section

FIG. 7 shows thread inspection tool 200 evaluating a tubular member 350 that has a longitudinal or central axis 351 and a box end 356, but one which lacks acceptable thread pullout distance. Box end 356 includes an internal shoulder 64 and an external shoulder 65. The as-built position of pullout starting location 358 and its pullout distance 359 are shown in the drawing. A specified minimum pullout distance 362 is measured and marked from external shoulder 65. Distance 362 is the inspection distance for box end 356, and so reference member 116 on tool 200 is adjusted and fixed so that the distance 143 is set equal to distance 362.

In FIG. 7, the x-axis of tool 200 is aligned parallel to axis 351 so that probes 118, 120, 122 extend radially with respect to tubular member 350. For this inspection, Reference member 116 is positioned to contact shoulder 65, and probes 118, 120, 122 are positioned within troughs 222 and contact roots 330 inside box end 66. More specifically, comparison probes 120, 122 are positioned within the first thread portion 91, above or contacting base region 94. Due to the short pullout distance 359, probe 118 is positioned within the second thread portion 92, above or contacting base region 96, placing probe 118 axially beyond pullout starting location 358. Consequently, probe 118 registers a height displacement relative to its baseline or its fully extended position. The height-displacement of probe 118 is evident by the non-zero value shown on output device 210. This is a "No-Go" condition, and threads 52 of pin end 356 fail to pass inspection.

A Fourth Exemplary Embodiment

Figure 8:
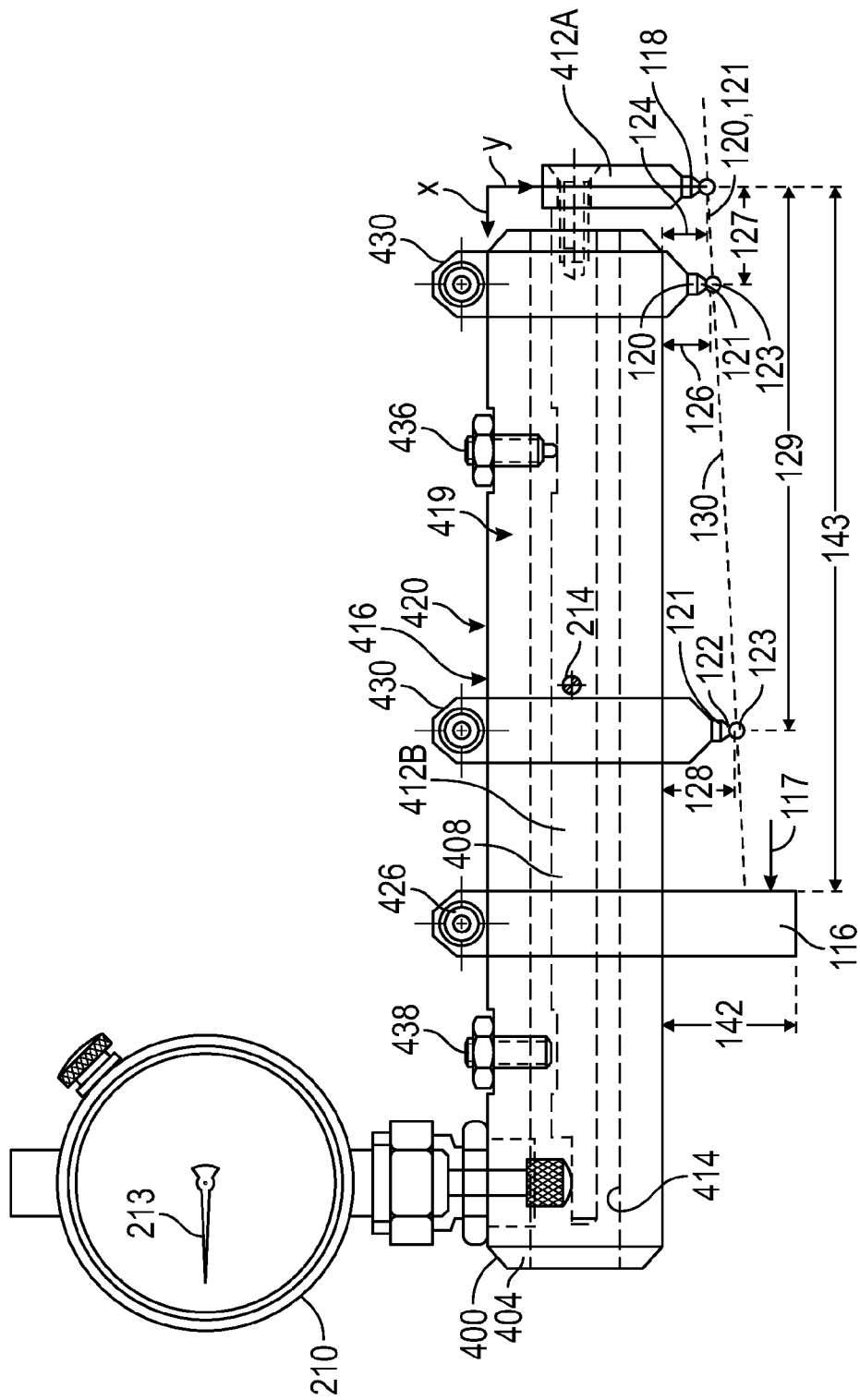
FIG. 8 shows a side view of a fourth embodiment of a thread inspection tool configured for evaluating the pullout starting location of threads along a tubular member in accordance with principles described herein.

Referring now to FIG. 8, in another embodiment, a thread inspection tool 400 has a mechanical coupling between a movable probe and a probe position indicator. Tool 400 is an example of a configuration of tool 200. Tool 400 includes an elongate housing or frame 404 extending in a first direction, which is indicated by an x-axis, and includes a plurality of contact members or probes 118, 120, 122 and a reference member 116 mounted to frame 404 and extending away from frame 404 in a direction different than the x-direction. The probes include a reciprocating probe 118 and comparison probes 120, 122 that extend in a y-direction, perpendicular to the x-direction. Tool 400 further includes a mechanical coupling or linkage 408 having interconnected linkage members 412A, 412B that couple the reciprocating probe 118 to an output device 210 mounted to frame 404. Output device 210 is an analog dial indicator with a needle 213, but a digital indicator could also be used.

Figure 9:
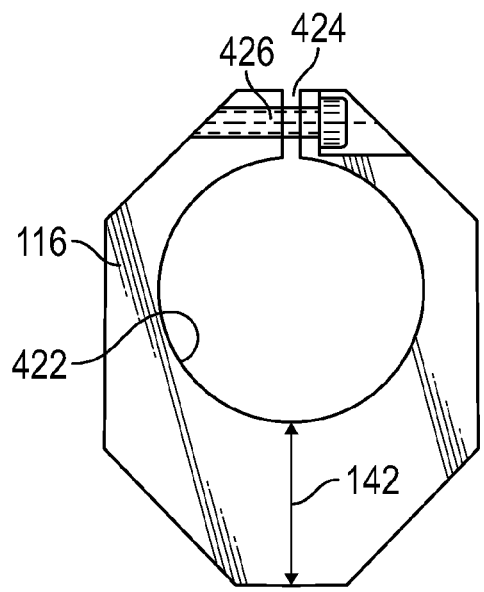
FIG. 9 shows a front view of a reference member of the thread inspection tool of FIG. 8.

Frame 404 is tubular member and includes a throughbore 414 and an outer surface 416. Outer surface 416 includes a cylindrical region 419 and a flat region 420. Shown best in FIG. 9, member 116 of tool 400 is a plate having a hole 422 to receive frame 404, a slot 424 extending outward from hole 422, and a fastener 426 extending across slot 424. In this example, hole 422 is located off-center to achieve a predetermined distance or height 142 between an end of member 116 and the perimeter of hole 422, which corresponds to the location of frame outer surface 416. In the x-direction, the distance 143 between probe 118 and a contact surface 117 of reference member 116 is adjustable by use of fastener 426.

Figure 10:
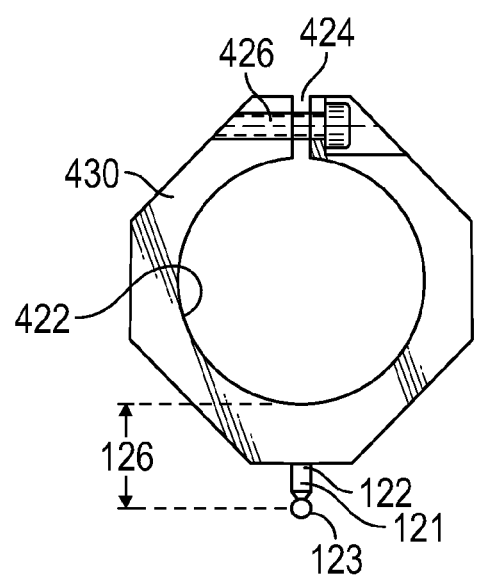
FIG. 10 shows a front view of a mounting piece for a probe of the thread inspection tool of FIG. 8.

Referring again to FIG. 8, each probe 118, 120, 122 includes probe stem 121 and a probe tip 123. Tips 123 are contact members and are configured, as previously described. Probes 120, 122 are each attached at the bottom of an adjustable mounting piece 430. As examples, probes 120, 122 may be threaded or press fit in to pieces 430. Shown best in FIG. 10, mounting piece 430 is a plate having a hole 422 to receive frame 404, a slot 424 extending outward from hole 422, and a fastener 426 extending across slot 424. In the x-direction, the distance 127 of probe 120 and the distance 129 of probe 122 from reciprocating probe 118 are adjustable by loosening the corresponding fastener 426. The x-distances 127, 129 are equal to or are integral multiples of the thread pitch as explained elsewhere herein. The distance 143 is greater than distance 129, which is greater than distance 127. The predetermined distances or heights 126, 128 of probes 120, 122 respectively, from the outer surface 416 of frame 404 may be adjusted by extending (e.g., threadingly) probe stems 121 or by replacing probes 120, 122 with longer embodiments. When mounted to frame 404 for operation, probes 120, 122 are stationary, having a fixed position in the x and y-directions that lie on a line 130 that is tapered with respect to the x-axis. Height 142 is greater than height 128, height 128 is greater than height 126, and height 126 is greater than height 124. Height 142 extends past line 130.

Probe 118 is attached to linkage member 412A of linkage 408 located outside the frame 405. Linkage member 412B extends from member 412A to the opposite end of frame 405 within throughbore 414, and linkage member 412B is pivotally coupled to frame 404 at an axis 214. At the opposite end of frame 405, member 412B couples to output device 210. With this arrangement, probe 118 is configured to reciprocate in the y-direction by pivoting about axis 214. A spring loaded set screw 436 pressing on linkage 408 biases probe 118 toward its baseline position along line 130. This baseline position is indicated by height 124. A second set screw 438 may engage linkage 408 to limit the travel of probe 118 in one direction. Output device 210 may include a second resilient member that aids in biasing probe 118 toward its baseline position. Output device 210 is configured to indicate the amount of displacement of probe 118 (e.g. tip 123) from its baseline position.

Tool 400 is configured to be used in the same or a similar manner as are the other tools disclosed herein, such as tools 100, 200, 300, when inspecting threads and can be used to inspect the same pin ends, box ends, and thread types as those tools, with equivalent results. Some or all of the methods of operation described herein for those tools may also be used to operate tool 400.

A Fifth Exemplary Embodiment

Figure 11:
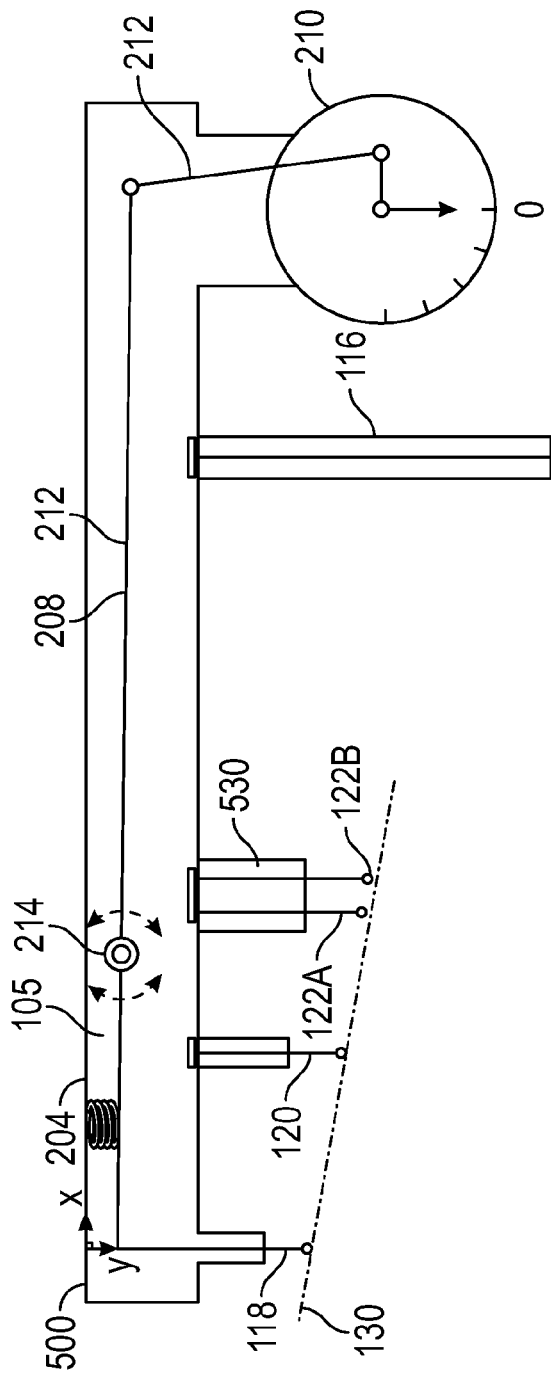
FIG. 11 shows a side view of a fifth embodiment of a thread inspection tool configured for evaluating the pullout starting location of threads along a tubular member in accordance with principles described herein.

Referring now to FIG. 11, in another embodiment, a thread inspection tool 500 is a modification of tool 200, having a mechanical coupling between a movable probe and a probe position indicator. Tool 500 includes a housing or frame 204 having an elongate portion 105 extending in a first direction, which is indicated by an x-axis, and includes a plurality of contact members or probes 118, 120, 122A,B and a reference member 116 mounted to frame 204 and extending away from portion 105 in a direction different than the x-direction. The probes include a reciprocating probe 118 and comparison probes 120, 122A,B that extends in a y-direction, perpendicular to the x-direction. A mechanical coupling or linkage 208 couples the reciprocating probe 118 to an output device 210 mounted to frame 204. Linkage 208 includes a pivotal coupling to frame 204 at an axis 214.

Figure 12:
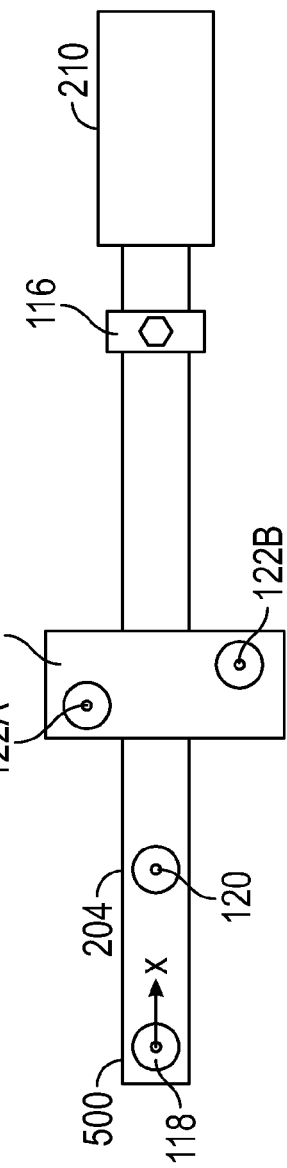
FIG. 12 shows a bottom view of the thread inspection tool of FIG. 11.

Probes 118 and member 116 are configured and are adjustable as described with respect to tool 200. In the x-direction, member 116 is disposed at an adjustable distance from probe 118, and probe 120 is disposed at an adjustable distance from probe 118, closer than member 116. A tapered line 130 that lies in the same plane as the x-axis defines a baseline position of probe 118, as described above. Probe 120 lies along line 130. Each probe 122A, 122B is configured as described above for probe 122 of tool 200, except the pair is assembled together in a mounting piece 530 that is coupled along frame portion 105 between member 116 and probe 120. The distance of mounting piece 530 from probe 118 is adjustable along the x-direction. As shown in FIG. 12, probes 122A, 122B are spaced apart on opposite sides of the x-axis each by an offset distance and are spaced apart on opposite sides of line 130. The offset distances of probes 122A, 122B can alternately be measured with respect to line 130, probe 118, or probe 120 since line 130 is coplanar with the x-axis. The offset distances of probes 122A, 122B are equal in some embodiments. In some embodiments, the offset distances are measured perpendicular to the x-axis and perpendicular to the height measurement of probe 118, 120, e.g. perpendicular the y-axis.

Probes 122A, 122B are also spaced apart along the x-axis, being positioned to rest within adjacent thread troughs, as an example. Consequently, probes 122A, 122B, which do not intersect line 130, are raised above it, as shown in FIG. 11. Probe 122A is closer to probe 118 than is probe 122B. The relative heights (i.e., the y-distance from frame portion 105) of member 116 and probes 118, 120, 122A, 122B are indicated FIG. 11. In various embodiments, the heights of probes 118, 120, 122A, 122B are adjustable or embodiments of these probes that are longer or shorter may be exchanged to account for thread taper or to account for the x-distances between the probes.

Tool 500 is configured to be used in the same or a similar manner as are the other tools disclosed herein, such as tools 100, 200, 300, 400 when inspecting threads and can be used to inspect the same pin ends, box ends, and thread types as those tools, with equivalent results. Some or all of the methods of operation described herein for those tools may also be used to operate tool 500.

ADDITIONAL INFORMATION

While sensor 108 in FIG. 2 was shown coupled by wire 112 for data communication with output device 110, in some embodiments, the data coupling between sensor 108 and output device 110 is wireless. In some embodiments, sensor 108 communicates by wires or wirelessly to an electronic output device or a data storage device that is separate from tool 100.

As described in reference to FIG. 2, in various embodiments, the height 124 corresponds to the baseline position of tip 123 on probe 118 when aligned with the tips 123 of other probes 120, 122 along line 130. In some embodiments, height 124 is the maximum distance the probe 118 can travel away from the tool's elongate portion 105. In some other embodiments, probe 118 can travel further than height 124 from elongate portion 105, and so, probe 118 has a resting position that is beyond its baseline position on line 130. Even in such embodiments, the "zero" measurement of probe displacement by an indicator 110, 210 may correspond to the baseline position of probe 118, e.g. when probe 118 is collinear with probes 120, 122. Indicator 110, 210 may be adjustable to achieve a zero value when probes 118, 120, 122 are collinear. In such embodiments, a zero measurement would indicate uniform thread depth.

Some embodiments of a thread inspection tool configured in accordance with principles described herein are self-stabilizing or self-supporting when positioned to evaluate the threads of a tubular member. For example, the adjustable reference member 116 may include two or more portions that are radially spaced apart by an adjustable distance. Such a two-part reference member 116 is configured to contact two separate locations on an external shoulder 55, 65 of a tubular member. During instances when the tubular member is standing vertically while being inspected, the two-part reference member 116 would rest against an external shoulder 55, 65 and would support the weight or stabilize the position of the thread inspection tool relative to the tubular member.

In FIG. 11 and FIG. 12 the pair of probes 122A, 122B of tool 500 was shown assembled together in a mounting piece 530 that is coupled along frame portion 105. Alternately, in some embodiments probes 122A, 122B are individually mounted to adjustable mounting pieces 430 (FIG. 10) and configured with a offset distance that is achieved, for example, by an angular offset of the mounting pieces 430 about the tool frame 204, 404. In some embodiments, the offset distance is achieved for a probe 120 and a single probe 122.

Although, various embodiments of inspection tools disclosed herein include a plurality of probes configured to contact the root of a thread, in some embodiments, an inspection tool includes one or more probes having a probe tip configured to contact another part of the thread, such as a portion of a thread that lies on or above the pitch region.

Although, thread inspection tools 100, 200, 300, 400, 500 were shown as being configured for hand-held use, in some embodiments of thread inspection tools configured in accordance with principles described herein are suited for use on a remotely operated vehicle or a computer controlled machine, such as an industrial robot for example. Any inspection of a pin end or a box end by a tool 100, 200, 300 described herein may optionally be performed by any other of the tools 100, 200, 300, 400, 500 following the same or a similar method. It is anticipated that the location of member 116 along a tool frame would be adjusted and fixed prior to placing the thread inspection tool along a pin end or within a box end; however, it would also be feasible to adjust and fix the location of member 116 while the tool is being positioned along a pin end or within a box end, particularly for embodiments that include distance markings along the frame.

Furthermore, some embodiments of thread inspections tool configured in accordance with principles described herein include more than two stationary probes. In at least some of these other embodiments, all of the plurality of stationary probes are collinear, i.e. their stationary tips are positioned so as to be collinear. Some embodiments of an inspection tool having an electric or an electronic coupling between a probe and an indicator, as does tool 100, have a single stationary probe, as does tool 300.

As stated above, threads 52, including their profile, are exemplary. Some embodiments of a thread inspection tool fabricated in accordance with principles described herein are configured to inspect other types of thread, such as straight, non-tapered threads or threads having a variable pitch, as examples, or any of various thread forms or profiles, such as square, trapezoidal, acme, or triangular (V-shaped) threads, as additional examples. In some embodiments, a thread inspection tool may be modified by using a directionally biased pushback mechanism on any of the probes 120, 122, 122A,B allowing the probe to change height, to accommodate variable thread pitch as the threads are traversed. As an example, the directionally biased pushback mechanism may be spring loaded.

While exemplary embodiments have been shown and described, modifications thereof can be made by one of ordinary skill in the art without departing from the scope or teachings herein. The embodiments described herein are exemplary only and are not limiting. Many variations, combinations, and modifications of the systems, apparatuses, and processes described herein are possible and are within the scope of the disclosure. Accordingly, the scope of protection is not limited to the embodiments described herein, but is only limited by the claims that follow, the scope of which shall include all equivalents of the subject matter of the claims. The inclusion of any particular method step or operation within the written description or a figure does not necessarily mean that the particular step or operation is necessary to the method. The steps or operations of a method listed in the specification or the claims may be performed in any feasible order, except for those particular steps or operations, if any, for which a sequence is expressly stated. In some implementations two or more of the method steps or operations may be performed in parallel, rather than serially.

What is claimed is:

1. A tool for evaluating a thread depth dimension of a tubular member having threads having a pitch region and a plurality of spaced apart troughs formed in part by a plurality of spaced apart thread roots, the tool comprising:
    a frame having an elongate portion extending in a first direction;
    a plurality of contact members coupled to the frame, each contact member configured to contact a trough below the pitch region;
    a first contact member of the plurality configured to contact a first trough below the pitch region, the first contact member configured to reciprocate in a second direction between a baseline height relative to the elongate portion and a retracted height relative to the elongate portion, the baseline height being greater than the retracted height;
    an output device coupled to the first contact member and configured to provide an output in response to a height of the first contact member;
    a reference member coupled to the frame at a first distance D1 from the first contact member as measured in the first direction; and
    a second contact member of the plurality configured to contact a second trough below the pitch region and coupled to the frame at a second distance D2 from the first contact member as measured in the first direction;
    wherein D1 is greater than D2; and
    wherein the first contact member is the furthest contact member of the plurality from the reference member.

2. The tool of claim 1 further including a sensor configured to sense the height of the first contact member and to communicate data indicative of the height sensed by the sensor;
    wherein the output device is coupled to the sensor, and the output of the output device is based on data received from the sensor.

3. The tool of claim 1 wherein the reference member is disposed at a first height from the frame;
    wherein the second contact member is disposed at a second height from the frame; and
    wherein the second height is greater than the baseline height of the first contact member and less than the first height of the reference member.

4. The tool of claim 1 further comprising a third contact member of the plurality configured to contact a trough below the pitch region and disposed a third distance D3 from the first contact member as measured in the first direction;
    wherein D3 is greater than D2 and less than D1.

5. The tool of claim 4 wherein the third contact member is disposed at a third height from the
    frame that is greater than the second height of the second contact member and less than the first height of the reference member.

6. The tool of claim 5 wherein the third contact member is disposed at an offset distance from the second contact member, wherein the offset distance is measured perpendicular to the first direction and perpendicular to the second height, and wherein the offset distance is greater than zero.

7. The tool of claim 4 wherein the first, second, and third contact members are configured to contact portions of the plurality of spaced thread roots.

8. The tool of claim 1 wherein the contact member is a probe tip disposed at an end of a probe stem that extends away from the elongate portion of the frame.

9. A tool for evaluating a thread depth dimension of a tubular member having threads having a pitch region and a plurality of spaced apart troughs formed in part by a plurality of spaced apart thread roots, the tool comprising:
    a frame having an elongate portion extending in a first direction;
    a plurality of contact members coupled to the frame, each contact member configured to contact a trough below the pitch region;
    a first contact member of the plurality configured to contact a first thread root below the pitch region and configured to reciprocate perpendicular to the first direction between a baseline height relative to the elongate portion and a retracted height relative to the elongate portion, the baseline height being greater than the retracted height;
    an output device coupled to the sensor and configured to provide an output in response to a height of the first contact member;
    a second contact member of the plurality configured to contact a second thread root below the pitch region and extending from the frame to a second height from the elongate portion that is greater than the baseline height of the first contact member, the second contact member being disposed at a second distance D2 from the first contact member as measured in the first direction;

a reference member extending from the frame to a first height that is greater than the second height of the second contact member, the reference member being disposed at a first distance D1 from the first contact member as measured in the first direction; and wherein D1 is greater than D2; and wherein the first contact member is the furthest contact member of the plurality from the reference member.

10. The tool of claim 9 further including a sensor configured to sense the height of the first contact member and to communicate data indicative of the height to the output device.

11. The tool of claim 9 wherein the reference member is configured to be moveable along the elongate portion such that D1 is selectable.

12. The tool of claim 9 wherein the second contact member is configured to be moveable along the elongate portion such that D2 is selectable.

13. The tool of claim 9 wherein the first contact member and the second contact member are spherical.

14. The tool of claim 13 wherein the diameter of each of the first contact member and the second contact member is less than a spacing between adjacent thread roots at a location below the pitch region.

15. The tool of claim 9 wherein the output device comprises a dial for indicating the height of the first contact member.

16. The tool of claim 9 further comprising a biasing member biasing the first contact member away from the frame.

17. The tool of claim 9 further comprising a third contact member of the plurality configured to contact a third thread root below the pitch region and extending to a third height from the elongate portion that is greater than the second height of the second contact member and less than the first height of the reference member;

wherein the third contact member is disposed at a third distance D3 from the first contact member as measured in the first direction; and wherein D3 is greater than D2 and less than D1.

18. A tool for evaluating a thread depth dimension of a tubular member having threads having a pitch region and a plurality of spaced apart troughs formed in part by a plurality of spaced apart thread roots, the tool comprising:

a frame having an elongate portion extending in a first direction;

a plurality of contact members coupled to the frame, each contact member configured to contact a trough below the pitch region;

a first contact member of the plurality configured to contact a first pair of adjacent thread roots below the pitch region and configured to reciprocate in a second direction between a baseline height relative to the elongate portion and a retracted height relative to the elongate portion, the baseline height being greater than the retracted height;

an output device coupled to the first contact member and configured to indicate a height of the first contact member;

a reference member coupled to the frame extending to a first height from the frame as measured perpendicular to the first direction;

a second contact member of the plurality configured to contact a second pair of adjacent thread roots below the pitch region and being disposed at a second height from the frame as measured perpendicular to the first direction; and wherein the first contact member is the furthest contact member of the plurality from the reference member.

19. The tool of claim 18 wherein the second direction is perpendicular to the first direction; and wherein first height and the second height are greater than the retracted height of the first contact member.

20. The tool of claim 18 wherein the second height is greater than the baseline height of the first contact member;

wherein the first height is greater than the second height;

wherein the reference member is disposed at a first distance D1 from the first contact member as measured in the first direction;

wherein the second contact member is disposed a second distance D2 from the first contact member as measured in the first direction; and wherein D1 is greater than D2.

* * * * *